United States Patent [19]
Horwitz et al.

[11] Patent Number: 5,424,827
[45] Date of Patent: Jun. 13, 1995

[54] OPTICAL SYSTEM AND METHOD FOR ELIMINATING OVERLAP OF DIFFRACTION SPECTRA

[75] Inventors: Bruce A. Horwitz, Newton; Steven J. Wein, Sudbury, both of Mass.

[73] Assignee: Litton Systems, Inc., Lexington, Mass.

[21] Appl. No.: 56,236

[22] Filed: Apr. 30, 1993

[51] Int. Cl.⁶ .............................................. G01J 3/36
[52] U.S. Cl. .................................................... 356/328
[58] Field of Search ............... 356/328, 333, 324, 326, 356/305, 334

[56] References Cited

U.S. PATENT DOCUMENTS

| | | | |
|---|---|---|---|
| 3,922,089 | 11/1975 | Danielsson et al. | 356/305 |
| 4,660,975 | 4/1987 | Aughton | 356/326 |
| 4,820,048 | 4/1989 | Barnard | 356/328 |
| 4,984,888 | 1/1991 | Tobias | 356/328 |
| 5,018,856 | 5/1991 | Harnly et al. | 356/328 |
| 5,139,335 | 8/1992 | Lundeen et al. | 356/328 |
| 5,343,289 | 8/1994 | Crawford et al. | 356/328 |

OTHER PUBLICATIONS

Kingslake, Rudolf, Applied Optics and Optical Engineering; vol. 5; Academic Press, New York 1969. pp. 80–83.
Daniel J. Schroeder, *Astronomical Optics,* Academic Press, Inc., pp. 284–291.

Primary Examiner—F. L. Evans
Attorney, Agent, or Firm—Michael H. Wallach

[57] ABSTRACT

An optical system and a method for separating overlapping spectra from a diffraction grating and an imaging spectrometer with increased free spectral range are disclosed. The light from a diffraction grating consists of multiple spectra overlapping each other and displaced along a spectral axis. The invention directs the light from the grating to a refractive element such, as a prism. The prism further disperses the light along the same spectral axis. The individual spectra are sufficiently displaced such that they no longer interfere with each other.

23 Claims, 5 Drawing Sheets

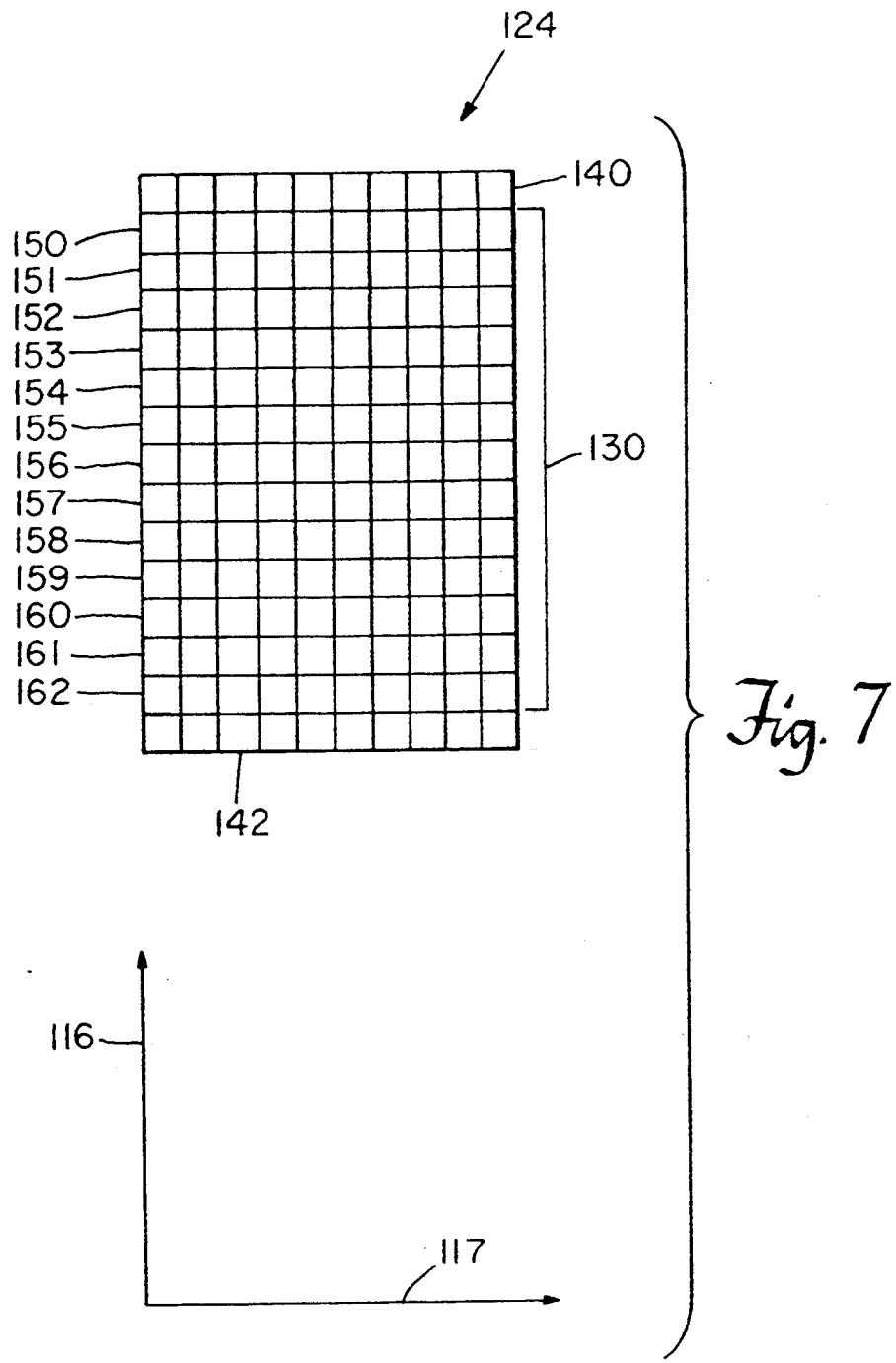

OPTICAL SYSTEM AND METHOD FOR ELIMINATING OVERLAP OF DIFFRACTION SPECTRA

BACKGROUND OF THE INVENTION

In many optical systems, a diffraction grating is used to spread light into a spectrum. The spectrum from the diffraction grating can be projected onto a screen or an array of detectors to allow the spectrum to be viewed or analyzed. The spectrum is spatially distributed along a spectral axis on the screen or the array of detectors.

Because of the periodic nature of the diffraction grating, the spectrum from the grating is actually composed of many replicated spectra, each individual spectrum being of a different integral order. In the general case, the individual spectra spatially overlap each other on the screen or array of detectors along the spectral axis. For example, the blue line in the second-order spectrum may be projected within the red portion of the first-order spectrum. In many applications, this overlap is undesirable. It is usually desirable to be able to analyze a single spectrum by itself without interference from spectra of different orders.

Techniques have been devised for eliminating overlap among the spectra in order to facilitate analysis. One technique uses band pass filters to eliminate the overlap. A second technique is known as cross dispersion. Cross dispersion involves dispersing the spectrum in the direction orthogonal to the spectral axis. The different order spectra are spatially displaced above or below each other. Thus, the spectrum of interest is left to be analyzed without interference from the other spectra.

Several drawbacks attend this approach. First, in many applications, both dimensions in the screen or the array of detectors are used to view or analyze the spectrum. Analysis is performed along both the spectral axis and a spatial axis orthogonal to the spectral axis. For instance, in many imaging spectrometers, the light from an extended object is imaged onto an entrance slit of the spectrometer oriented along a spatial axis. The light is then spectrally dispersed by the spectrometer in a direction along the spectral axis perpendicular to the slit or spatial axis. Thus, the direction perpendicular to the slit (spectral axis) contains the spectral information while the direction along the slit (spatial axis) contains the spatial information for a given strip of the target object. Since the direction orthogonal to the spectrum is used for spatial information, the higher-order spectra cannot be displaced in this direction.

Another drawback of cross dispersion involves the phenomenon known as "smile." If the higher-order spectra are displaced orthogonally away from the lowest-order spectrum by a refractive element such as a prism, then the short wavelength light is dispersed by the refractive element more than long wavelength light. This property has detrimental effects on the technique. The spectra tend to bend into a "smile." Thus, the desired one-dimensional mapping of the spectra for each point of light is distorted into a two-dimensional curved mapping.

SUMMARY OF THE INVENTION

The present invention is an optical system and a method for separating diffraction spectra which spatially overlap. The spectra are obtained from a diffracting device such as a diffraction grating. Light is diffracted to produce multiple overlapping spectra of light. The spectra are spatially distributed and overlap each other along a spectral axis. The light containing the multiple overlapping spectra is directed through a dispersive or refractive element such as a prism. The dispersive or refractive element spectrally disperses the light further along the same spectral axis. The additional dispersion along the spectral axis substantially eliminates overlap among the spectra from the diffraction grating. Thus, the second-order spectrum is displaced off of and beyond the first-order spectrum in the same direction as the dispersion provided by the grating.

In one embodiment, the light from the refractive element is projected onto a two-dimensional array of optical detectors. Each row of detectors in the array corresponds to a narrow wavelength band in a spectrum to be analyzed. In one embodiment, the higher-order spectra are displaced so far beyond the first order that they do not fall upon the detector array. Only the first order is detected by the array. In an alternative embodiment, the higher orders are not necessarily displaced beyond the array. The spectra are sufficiently displaced away from each other such that each ordered spectrum corresponds to a unique group of rows of detectors in the array. The detector rows corresponding to the spectrum of interest are read from the array and analyzed. Thus, the first-order spectrum can be analyzed independently of interference from other spectra generated by the diffraction grating.

The present invention is also directed to an imaging spectrometer having extended free spectral range. Light from a scene enters the imaging spectrometer through a single slit oriented along a spatial dimension or spatial axis. The light is diffracted by a grating along a spectral dimension or spectral axis orthogonal to the spatial axis. The refractive element of the invention further disperses the light along the spectral axis to separate the spectral orders. The resulting light is projected onto the two-dimensional detector array. One dimension of the array corresponds to the spatial axis along which the slit is oriented. The other dimension corresponds to the spectral axis. Thus, each pixel of the imaged slit along the spatial axis is spread into a spectrum along the spectral axis. The spectrum of each pixel is the first-order spectrum separated from the higher-order spectra by the system of the present invention. The optical system for separating spectra is aptly suited to be the dispersing mechanism in an imaging spectrometer where the imagery is obtained in a line-scanned or "push broom" manner.

The present invention has numerous advantages over the cross dispersion method of prior systems. Because the additional dispersion takes place along the spectral axis, the system of the present invention can utilize both dimensions in the two-dimensional detector array, namely, the spectral dimension and the spatial dimension. In the cross dispersion method of prior systems, the spatial dimension was not available. The higher-order spectra were dispersed into the spatial dimension, therefore leaving it unusable for analysis. The ability to use both dimensions in the array makes the invention applicable to the imaging spectrometer.

Also, the "smile" phenomenon of the prior systems is eliminated. In the system of the present invention, the property of short wavelength light being displaced more than long wavelength light works to the benefit of the system. The short wavelength components of the higher-order spectra are more easily displaced away from the long wavelength components of the lower-order spectra along the spectral axis. Thus, the lower-order spectra are more easily isolated from the higher-order spectra.

The imaging spectrometer of the present invention also has advantages over prior imaging spectrometers. The free spectral range of prior grating spectrometer devices was severely limited by the overlap of spectral orders. The first order could only be analyzed to the extent to which no overlap was present. The present invention displaces the higher-order spectra beyond the first order to allow analysis of effectively the entire first-order spectrum.

To eliminate the problem of overlapping orders in grating spectrometers, prism spectrometers have been used. By using a prism, incoming light is dispersed in a single spectrum. No ordered spectra are produced, and, consequently, there are no overlapping spectra. However, an inherent drawback to this type of device is non-linearity of the dispersion of the spectrum. Since the present invention uses a grating to spectrally disperse the incoming light, the invention produces a more linear spectrum than a prism spectrometer. Some non-linearity is introduced by the prism following the grating, but the spectrometer of the present invention exhibits significantly less non-linearity than prism spectrometers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a schematic plan view of a two-dimensional array of detectors used in the imaging spectrometer of FIG. 6.

DETAILED DESCRIPTION OF THE INVENTION

Figure 1:
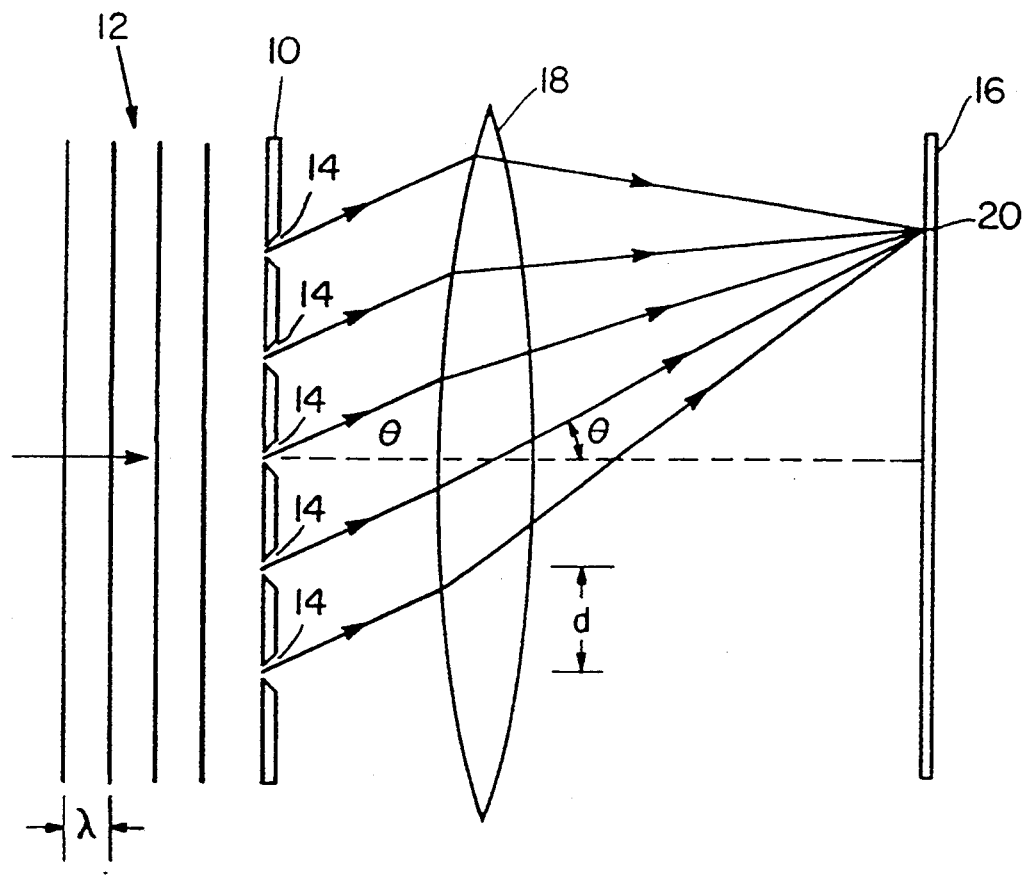
FIG. 1 is a schematic illustration of the operation of a diffraction grating.

FIG. 1 schematically depicts the operation of a diffraction grating 10 for monochromatic light. Light waves 12 of a single wavelength $\lambda$ are incident upon the face of the grating 10. Light is diffracted by the slits 14 in the grating 10 and is focused by lens 18 on a screen 16.

FIG. 1 depicts the projection of a principle maximum 20 within the diffracted output of the grating 10. Principle maxima in the output occur when $$d(\sin\theta - \sin\theta_o) = m\lambda \quad m = 0, 1, 2, \ldots; \text{ where}$$

d is the spacing between slits in the grating, $\theta$ is the diffraction angle as indicated in FIG. 1, $\theta_o$ is the incident angle on the grating, $\theta$ is the wavelength of the light, and m is the order number.

FIG. 1 shows a principle maximum 20 for a single order at a single wavelength. At this same wavelength, other principle maxima will be projected onto the screen 16. Each of these principle maxima corresponds to another order. Thus, for a single wavelength of light striking the grating 10 at normal incidence ($\theta = 0$), a periodic series of principle maxima, one for each order, is projected onto the screen 16.

Figure 2:
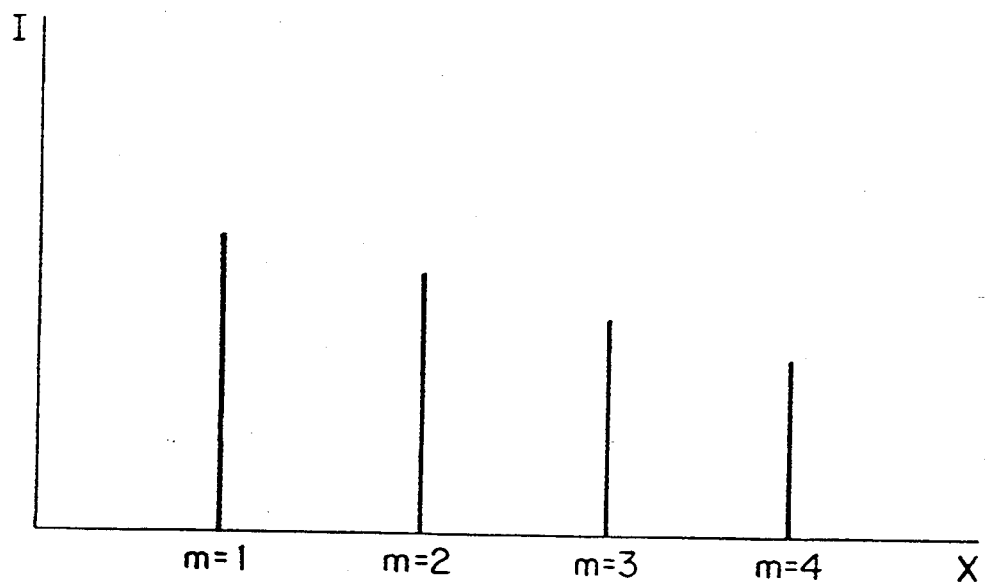
FIG. 2 is a schematic plot of principle maxima from a diffraction grating for a single wavelength of light for several spectral orders.

FIG. 2 is a schematic plot of intensity I of monochromatic light of wavelength $\lambda_1$ projected onto the screen 16 from grating 10 as a function of linear position x along the screen. The x-axis represents the spectral axis along which the spectrum is projected. The plot shows the periodic series of principle maxima which are projected onto the screen 16. The plot shows the principle maxima for orders 1–4.

Figure 3:
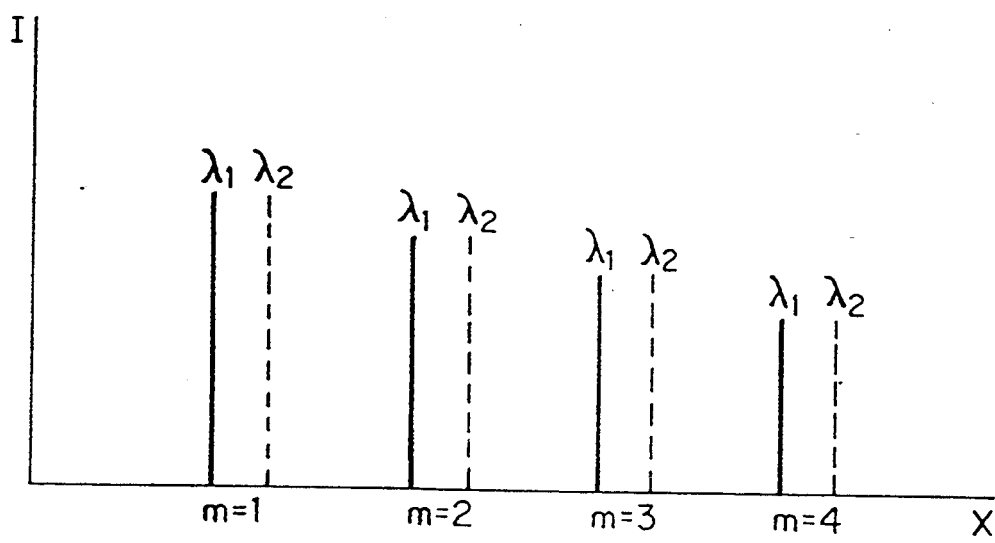
FIG. 3 is a schematic plot of principle maxima from a diffraction grating for two wavelengths of light for several ordered spectra.

When a second wavelength $\lambda_2$, longer than $\lambda_1$, is added to the incoming light, another group of principle maxima is added to the monochromatic group. This is illustrated in the plot of FIG. 3. For each order, a second principle maximum is projected beside the first principle maximum.

From FIG. 3, it will be understood that as more wavelengths of light are added to the incoming light, more principle maxima are added to each order. Finally, if white light is directed onto the grating, each order will project its own individual spectrum onto the screen 16. In general, these individual order spectra will overlap each other along the spectrum axis. For example, a short wavelength line in the second-order spectrum may appear to the left of a long wavelength line in the first-order spectrum.

Figure 4:
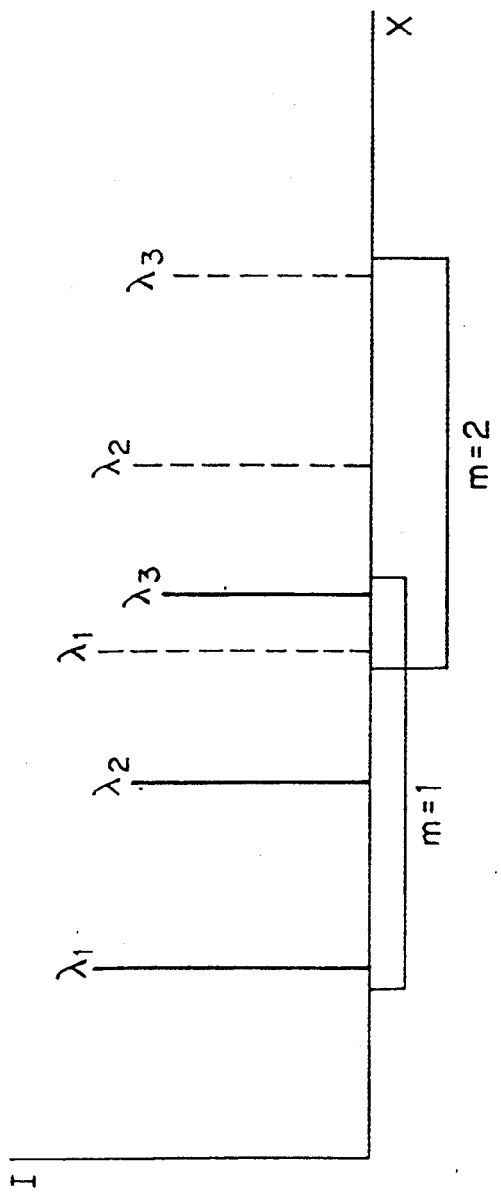
FIG. 4 is a schematic plot of principle maxima for three wavelengths of light in each of two ordered spectra.

FIG. 4 schematically depicts the overlap of first and second-order spectra. For both the first order (m=2) and the second order (m=2), the principle maximum for three individual wavelengths is shown. The first-order spectrum is shown in solid lines; the second-order spectrum is shown in dashed lines. Wavelength $\lambda_1$ is the shortest wavelength passed by the optical system or the shortest wavelength to which the detector responds. Thus, wavelength $\lambda_1$ is the shortest of the three wavelengths, $\lambda_2$ is longer than $\lambda_1$, and $\lambda_3$ is the longest of the wavelengths. The two individual spectra are projected on the screen with $\lambda_1$ of the second-order spectrum appearing within the first-order spectrum, specifically, between $\lambda_2$ and $\lambda_3$ of the first-order spectrum. Because $\lambda_1$ of the second-order spectrum is present within the first-order spectrum, analysis of the first-order spectrum is inhibited.

The present invention disperses the light from the diffraction grating to displace it further along the spectral (or x) axis to eliminate the overlap. The higher-order spectra will be displaced far enough along the axis such that they will no longer interfere with the first-order spectrum. Specifically, referring to FIG. 4, the second-order spectrum will be displaced far enough along the x-axis such that the second order principle maximum for $\lambda_1$ will no longer be projected within the first-order spectrum.

Figure 5:
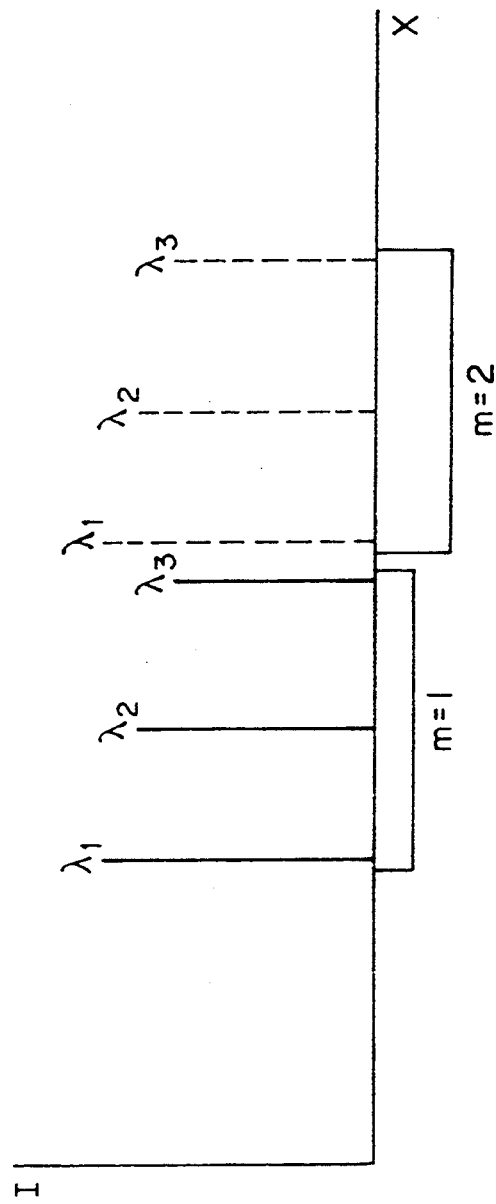
FIG. 5 is a schematic plot of the spectral orders of FIG. 4 after being separated in accordance with the present invention.

FIG. 5 shows the first and second-order spectra of FIG. 4 after the additional dispersion of the present invention has been introduced. Both spectra have been displaced along the spectrum axis. The second-order spectrum has been displaced far enough along the axis such that it no longer interferes with the first-order spectrum.

As previously mentioned, the present invention utilizes a refractive element such as a prism to disperse the diffraction spectrum from the grating 10. A characteristic of a refractive device is that short wavelength light is dispersed more than long wavelength light. This phenomenon allows the short wavelengths of the second-order spectrum to be displaced beyond the long wavelengths of the first-order spectrum. Therefore, $\lambda_1$ of the second-order spectrum is displaced along the x-axis more than $\lambda_3$ of the first-order spectrum since $\lambda_1$ is shorter than $\lambda_3$. This results in the second-order spectrum no longer interfering with the first-order spectrum.

As shown in FIGS. 4 and 5, the entire spectrum including the first and second-order spectra is displaced along the spectral axis. As described above, the short wavelengths are displaced more than the long wavelengths. This allows the overlap among spectra to be eliminated. Also, as shown in the figures, the individual spectra are slightly compressed spatially. The linear distance between the ends of each of the spectra is reduced.

Figure 6:
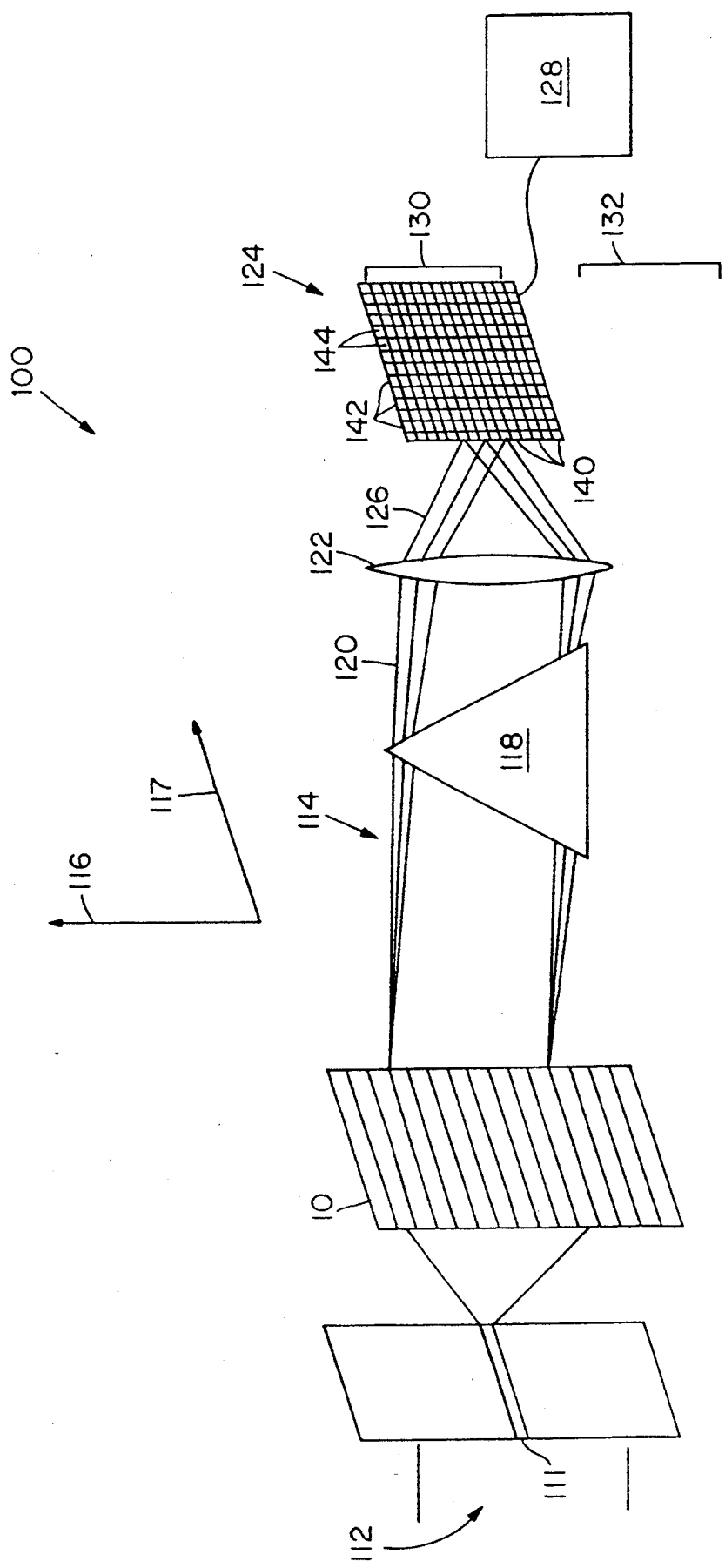
FIG. 6 is a schematic illustration of an embodiment of an imaging spectrometer in accordance with the present invention.

FIG. 6 schematically illustrates an embodiment of an imaging spectrometer 100 in accordance with the present invention. The imaging spectrometer 100 utilizes the system and method for separating spectral orders described above.

Incident light 112 passes through a single slit aperture 111 oriented along spatial axis 117 and falls upon diffraction grating 10. The diffraction grating 10 can be either a reflective or transmissive grating. The dispersed output light 114 from the diffraction grating 10 is distributed along the spectral axis 116. The light 114 falls upon prism 118. In the case of a reflective grating, the prism assembly can be double passed by the light to double the dispersion introduced by the prism, if desired or necessary. The prism 118 is oriented such that the light 114 is further dispersed along the spectral axis 116. The light 120 dispersed by prism 118 is focused by lens 122 onto a two-dimensional array 124 of detectors.

The detector array 124 is oriented such that rows 140 of detectors 144 extend along the spatial axis 117. Columns 142 extend along spectral axis 116. Each horizontal row 140 corresponds to a narrow wavelength band in the light 126 from the lens 122. A processing circuit 128 reads the detected light intensity data out of the detector array 124 and performs the appropriate spectral analysis of the detected data.

As previously described, the light 114 from the diffraction grating 10 comprises multiple overlapping ordered spectra. The prism 118 provides sufficient further dispersion such that the higher-order spectra are displaced along the spectral axis 116 to eliminate the overlap. Thus, the light 126 which falls upon the array of detectors 124 does not exhibit the overlap of higher-order spectra. In the preferred embodiment, the higher-order spectra are displaced beyond the end of the detector array 124. This is shown in FIG. 6 by the bracketing of the ordered spectra shown in relation to the array 124.

Brackets 130 and 132 are intended to illustrate the projection from lens 122 of the individual spectra separated in accordance with the invention. Bracket 130 may indicate the first-order spectrum while bracket 132 may indicate the second-order spectrum which has been displaced beyond the detector array 124. Thus, the first-order spectrum is projected onto the detector array 124 without interference from any higher-ordered spectra. When it is desired to spectrally process the first-order spectrum, the processing circuit 128 reads detector data from the array 124. This data does not include data from other spectra.

In an alternative embodiment, the higher-order spectra are displaced beyond the first-order spectrum but they are not displaced beyond the detector array 124. Rather, they are also detected by specific groups of detector rows. To process a spectrum, the processing circuit 128 reads only the rows of pixel data corresponding to the spectrum of interest, usually the first-order spectrum.

Thus, due to the additional dispersion by prism 118, the optical system 100 exhibits extended free spectral range. That is, the range of wavelengths of the first-order spectrum which can be analyzed without interference from other spectra is extended by the present invention.

FIG. 7 is a schematic plan view of the detector array 124 of the optical system 100. The detector array 124 presents a two-dimensional spectral image of the slit aperture 111 of the imaging spectrometer 100. Optical detectors 144 are arranged in rows 140 and columns 142. The rows 140 extend along the spatial axis 117, and the columns 142 extend along spectral axis 116. Each of the detectors 144 generates an electrical signal which corresponds to the intensity of the light which strikes the detector 144.

In FIG. 7, the first-order spectrum is distributed along rows 150–162 of the array 124. Each row detects a specific wavelength band within the spectrum and generates a signal indicative of the intensity of the light of that wavelength band. For example, rows 150, 155 and 162 may detect blue light, green light and red light, respectively, in the first-order spectrum. Spectral analysis is performed by reading the signals from the rows of detectors which correspond to the spectrum.

While this invention has been particularly shown and described with references to preferred embodiments thereof, it will be understood by those skilled in the art that various changes in form and details may be made therein without departing from the spirit and scope of the invention as defined by the appended claims. For example, the diffraction spectra need not be generated by a diffraction grating. Any similar multiple-aperture device which generates spectra having multiple orders can be used. The present invention will separate the individual spectra. Also, the prism can be replaced with other similar devices which refract the diffraction spectra along the spectral axis.

The invention claimed is:

1. A method of separating spatially overlapping diffraction spectra comprising:
    diffracting light from a scene to produce a first plurality of spectra, said first plurality of spectra being spatially distributed along a spectral axis and spatially overlapping along the spectral axis; and directing the light of the first plurality of spectra through a dispersive element, said dispersive element spectrally dispersing the light of the first plurality of spectra along the spectral axis to produce a second plurality of spectra, said second plurality of spectra spatially overlapping along the spectral axis less than the first plurality of spectra.

2. The method of claim 1 wherein the light is diffracted by a diffraction grating in the diffracting step.

3. The method of claim 1 wherein the dispersive element is a prism.

4. The method of claim 1 further comprising the step of directing light of the second plurality of spectra onto a two-dimensional array of detectors.

5. The method of claim 4 further comprising processing electrical signals from the detectors corresponding to the intensity of the light of the second plurality of spectra to spectrally analyze the light of the second plurality of spectra.

6. The method of claim 1 further comprising the step of spectrally analyzing the light of the second plurality of spectra.

7. The method of claim 6 wherein the step of spectrally analyzing the light of the second plurality of spectra comprises:
directing the light of the second plurality of spectra onto a two-dimensional array of detectors to produce electrical signals corresponding to the intensity of the light of the second plurality of spectra; and
processing the electrical signals to spectrally analyze the light of the second plurality of spectra.

8. The method of claim 6 wherein the step of spectrally analyzing the light of the second plurality of spectra comprises:
directing the light of the second plurality of spectra onto a two-dimensional array of detectors; and
reading detector data from the array of detectors.

9. The method of claim 4 wherein:
a first dimension in the two-dimensional array of detectors corresponds to a spatial axis through a plurality of points of light in the scene; and
a second orthogonal dimension in the two-dimensional array of detectors corresponds to the spectral axis for each point of light such that spectral and spatial information for plural individual points can be deteeted simultaneously.

10. An optical system for separating overlapping diffraction spectra comprising:
an apparatus for diffracting incoming light from a scene into a first plurality of spectra, said first plurality of spectra being spatially distributed along a spectral axis and spatially overlapping along the spectral axis; and
a dispersive element for spectrally dispersing the light of the first plurality of spectra along the spectral axis to produce a second plurality of spectra, said second plurality of spectra spatially overlapping along the spectral axis less than the first plurality of spectra.

11. The optical system of claim 10 wherein the apparatus for diffracting is a diffraction grating.

12. The optical system of claim 10 wherein the dispersive element is a prism.

13. The optical system of claim 10 further comprising a two-dimensional array of detectors for receiving the light of the second plurality of spectra.

14. The optical system of claim 13 further comprising a processing circuit for processing electrical signals from the detectors corresponding to the intensity of the light of the second plurality of spectra to spectrally analyze the light of the second plurality of spectra.

15. The optical system of claim 9 further comprising a processing circuit for reading detector data from the two-dimensional array of detectors and for processing the detector data to spectrally analyze the light of the second plurality of spectra.

16. The optical system of claim 10 further comprising an analysis subsystem for receiving and spectrally analyzing the light of the second plurality of spectra.

17. The optical system of claim 10 wherein the optical system is an imaging spectrometer.

18. An imaging spectrometer comprising:
an aperture for passing light from a scene;
a diffraction grating for producing a first plurality of spectra, said first plurality of spectra being spatially distributed along a spectral axis and spatially overlapping along the spectral axis; and
a refractive element for spectrally dispersing the light of the first plurality of spectra along the spectral axis to produce a second plurality of spectra, said second plurality of spectra overlapping along the spectral axis less than the first plurality of spectra.

19. The imaging spectrometer of claim 18 wherein the refractive element is a prism.

20. The imaging spectrometer of claim 18 further comprising a two-dimensional array of detectors receiving the light of the second plurality of spectra.

21. The imaging spectrometer of claim 20 further comprising a processing circuit for reading detector data from the two-dimensional array of detectors and for processing the detector data to spectrally analyze the light of the second plurality of spectra.

22. The imaging spectrometer of claim 18 further comprising an analysis subsystem for receiving and spectrally analyzing the light of the second plurality of spectra.

23. The imaging spectrometer of claim 18 wherein:
a first dimension in the two-dimensional array of detectors corresponds to a spatial axis through a plurality of points of light in the scene; and
a second orthogonal dimension in the two-dimensional array of detectors corresponds to the spectral axis for each point of light such that spectral and spatial information for plural individual points can be detected simultaneously.

* * * * *